United States Patent [19]

Lutz

[11] 4,392,134
[45] Jul. 5, 1983

[54] LOCKING DEVICE WITH PROGRAMMABLE KEY

[75] Inventor: Dieter Lutz, Schweinfurt, Fed. Rep. of Germany

[73] Assignee: Sach-Systemtechnik GmbH, Fed. Rep. of Germany

[21] Appl. No.: 263,186

[22] Filed: May 13, 1981

Related U.S. Application Data

[63] Continuation of Ser. No. 43,680, May 30, 1979.

[30] Foreign Application Priority Data

Jun. 7, 1978 [DE] Fed. Rep. of Germany ....... 2824892

[51] Int. Cl.³ .................... E05B 19/18; E05B 47/00
[52] U.S. Cl. ............................ 340/825.31; 70/398; 70/413
[58] Field of Search ............... 340/825.31; 200/44; 70/DIG. 1, 277, 278, 285, 319, 385, 393, 398, 399, 409, 411, 413; 361/172

[56] References Cited

U.S. PATENT DOCUMENTS

| | | | |
|---|---|---|---|
| 3,582,890 | 6/1971 | Rivers | 340/825.31 |
| 3,854,120 | 12/1974 | Matto et al. | 361/172 |
| 3,902,342 | 9/1975 | Zucker et al. | 70/DIG. 51 |
| 4,107,655 | 8/1978 | Moorhouse | 340/825.31 |
| 4,257,030 | 3/1981 | Bruhin et al. | 340/825.31 |

FOREIGN PATENT DOCUMENTS

| | | |
|---|---|---|
| 2360597 | of 1975 | Fed. Rep. of Germany . |
| 2041368 | of 1976 | Fed. Rep. of Germany . |
| 2706919 | 8/1978 | Fed. Rep. of Germany . |
| 2727126 | 12/1978 | Fed. Rep. of Germany . |
| 2159805 | of 1973 | France . |
| 620665 | 3/1949 | United Kingdom . |
| 661998 | 1/1951 | United Kingdom . |
| 665137 | 1/1952 | United Kingdom . |
| 1273119 | 5/1972 | United Kingdom . |

*Primary Examiner*—Donald J. Yusko
*Attorney, Agent, or Firm*—Toren, McGeady and Stanger

[57] ABSTRACT

A locking device includes a key and a reading device. The key has a grip portion and a plurality of information carrier parts attached to the grip portion. The information carrier parts determine the locking code for the key. Each information carrier part is arranged to receive an information element and the carrier parts are adjustably positionable for disposing the information elements into a predetermined angular pattern. The reading device is arranged to read the locking code on the key and to compare it with a predetermined locking code for operating a lock. The information carrier parts are mounted on a member extending axially from the grip portion of the key. The carrier parts are angularly adjustably positionable about the axis of the member. The reading device contains elements for the detecting the presence or absence of the information elements in predetermined angular positions.

20 Claims, 12 Drawing Figures

LOCKING DEVICE WITH PROGRAMMABLE KEY

This is a continuation of application Ser. No. 043,680 filed on May 30, 1979.

SUMMARY OF THE INVENTION

The present invention is directed to a locking device including a key having a grip portion on which a plurality of information carrier parts are supported with the position of the carrier parts determining the locking code for the key. The carrier parts can be selectively positioned relative to one another about a common axis in a predetermined angular pattern. The locking device also includes a reading device for reading the locking code of the key and comparing it with a predetermined locking code.

A locking device of this general type is disclosed in German Pat. No. 21 38 991.

This device is a mechanical lock having tumblers which can be placed in the unlocked position by switching magnets in the lock housing when a magnetic field of predetermined direction is located in the region of the switching magnets by means of the key. The key has two magnets arranged next to one another in a plane. The magnets are supported on locking discs which can be displaced about axes extending perpendicularly relative to the direction of magnetic polarization. By turning the locking discs, the angular position of the directions of polarization relative to one another can be changed so that the key is coded. This known locking device has the disadvantage that the size of the key increases disproportionately when a large number of coding variations is required.

Therefore, it is the primary object of the present invention is provide a locking device in which a great number of code variations are possible while the structural arrangement is maintained as simple as possible and the size of the key is kept relatively small. Further, the invention includes the possibility of changing the locking code used in the device.

In accordance with the present invention, the information carrier parts are mounted on the grip portion of the key so that they can be displaced angularly about a common axis into selected positions. The reading device detects the presence or absence of information elements located on the information carrier parts in at least a portion of the predetermined positions in the angular pattern provided by the information carrier parts. As a result, it is possible to provide a very great number of coding possibilities in a key and to afford the adjustment in a simple manner. Further, it is also possible to keep the size of the key small so that it is easy to handle.

In a preferred embodiment, at least a portion of the information carrier parts contain information elements offset relative to one another in an angular pattern with each information element spaced an equal distance radially outwardly from the common axis. In addition, the reading device contains several reading elements offset relative to one another in an angular pattern for checking the information elements on the carrier parts. In this manner, each angular pattern position of each information carrier part is assigned a different part of the locking code which consists of several bits. The number of information elements on each carrier part may differ from the number of reading elements assigned to the information carrier part.

In another embodiment it has been found to be especially advantageous if each carrier part is adjustable into eight angular pattern positions uniformly distributed over 360° with each part containing four information elements. Three of the information elements are arranged in adjacent positions and the fourth information element is spaced from the other three by a blank space in the angular pattern. In such an arrangement, it is preferable if the reading device has three reading elements for each information carrier part with the reading elements disposed in adjacent positions in the angular pattern. In this arrangement of the information elements, a different code consisting of three bits is assigned to each of the angular positions of the information carrier parts.

In another preferred embodiment of the key, the information carrier parts are rings or annularly shaped members located one after the other along the axis of the support member attached to the grip portion. The information elements are located on the outer circumference of the annularly shaped members. To lock the annularly shaped members in individual angular positions, on one end surfaces extending transversely of the axis, at least one axially extending plug is provided, for example a plug pin, and, on the opposite transversely extending end surface, recesses are arranged in the angular pattern for receiving the plug projection. Accordingly, the annularly shaped members mounted on the axially extending member can be connected to one another in any position of the angular pattern and retained against any relative angular movement.

In still another embodiment the annularly shaped members have a polygonally shaped internal profile or surface symmetrical with the axis of rotation and the axially extending member supporting the carrier parts has a complementary shaped external surface. Preferably, these polygonally shaped surfaces are equilateral. The shaped configuration of the external surface of the axially extending member may extend over its entire length, however, to afford angular adjustment of the carrier parts relative to one another the annularly shaped members would have to be completely removed from the axially extending member. It is possible to provide an arrangement where the carrier parts are secured against loss where the polygonally shaped surfaces in the annularly shaped members and on the axial member each extend for less than half of the axial length of one annularly shaped member. Accordingly, adjustment is possible when one of the annularly shaped members is displaced in the axial direction so that its shaped profile no longer engages the complementary shaped profile of the axially extending member.

The part of the key extending axially from the grip portion and supporting the information carrier parts may be a screw threaded into the grip portion so that it is retained against loss. In another embodiment, the axially extending part of the key is slidably displaceable through the information carrier parts and through a base portion connected to the parts with the end of the axially extending member spaced from the grip portion forming an abutment head and its other end consisting of a clamp handle located at the grip portion. The clamp handle can be displaced between two positions, in one position the information carrier parts are held in position between the base portion and the abutment head, while in the other position a certain amount of axial movement of the carrier parts along the axially extending member is possible to provide any desired repositioning or adjustment.

In the above-described embodiments where the information carrier parts are arranged next to one anothr along the axis of the key, there is the advantage that the reading elements can be accommodated in the reading device without any difficulty and within a relatively small space even though the number of the reading elements is relatively large. In another preferred embodiment, the information carrier parts are in the form of rings or annularly shaped members and are secured on the grip portion about a common axis with one part extending concentrically about the other. At least one information element is provided on each part, on the surface which extends transversely of the common axis and is spaced from the grip portion. Such a key has particularly small outside dimensions and the housing of the reading device can be arranged on a planar surface, for example, a glass surface and, in addition, the housing has a very small axial dimension.

In this last embodiment, the annularly shaped members can be held on the grip portion by a single screw or similar member when radially inwardly projecting shoulders are provided on the axially extending surfaces of the parts spaced from the transverse surfaces containing the information elements, with the shoulders affording an interlocking engagement with the adjacent carrier part or with the member securing the carrier parts to the grip portion.

It may be advantageous in certain applications, to locate some of the information elements on the angularly adjustable information carrier parts while other information elements are rigidly connected to the grip portion, that is, the other elements are not movably displaceable. Information elements held in a stationary position relative to the grip may be part of the locking code of the key. However, such stationary information elements can be used for initiating the operation of the reading device, for example, by generating a signal indicating the complete insertion of the key into the reading device.

The information elements may be magnetic information elements which are scanned by Hall probes or they may be magnetic switches or reed switches. Such information elements may consist entirely of a magnetizable material in which individual regions are magnetized forming the information elements, or separate permanent magnets can be arranged in the information carrier parts.

Alternatively, if the information carrier parts or the grip portion are formed of an electrically insulating material, electric contact surfaces can be provided on the outer surface of the carrier parts as information elements. Such embodiments have a simple design. The contact surfaces may be arranged so that a connection to a chassis is obtained for the individual circuits and such an arrangement is particularly advantageous when the locking device is used in a motor vehicle.

It is also possible to provide a code for the key which is operated by light. Regions of different light reflecting character can be provided on the outer surface of the key. The reflecting character is detected by photo elements in the reading device with the photo elements responding to the light from a light source which is reflected off the outer surface of the key. In addition, the light source could be provided within the key when windows are provided in the key at the location of the information elements so that the light can pass through the windows. In place of a light source located in the key, light diodes may be arranged at the outer circumference of the key with the light from the diodes being received by photo elements in the reading device. A current supply for the light sources in the key can be provided by a battery or the like located in the key, however, it is also possible to provide contacts on the key so that the key is connected to the current supply of the reading device.

In accordance with the present invention, the locking device generates a release signal when the locking code of the key and the predetermined locking key coincide. This signal is used to control the actual lock. Accordingly, the locking device is particularly suited for the central locking systems in motor vehicles.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
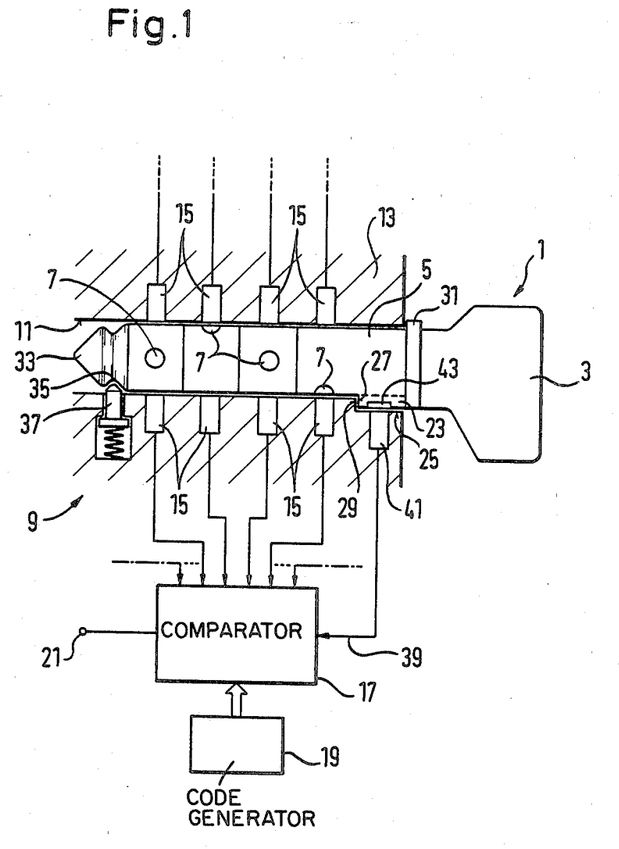
FIG. 1 is a schematic side view, partly in section, of one embodiment of a locking device incorporating the present invention with the device consisting of a key which can be coded, and a reading device.

In FIG. 1, a key 1 is illustrated having a grip portion 3 for use in handling the key and an essentially circular cylindrical information carrier 5 extending axially from the grip portion. Information carrier 5 includes a plurality of magnetic information elements 7 which are distributed in a pattern along the cylindrical axis of the information part and also in an angular pattern around the outer circumference of the information part. The distribution of the magnetic information elements in the pattern establishes a binary locking code for the key in which the pattern of the information elements 7 correspond to a bit "1" and the vacant spaces in the pattern represent a bit "0".

The locking code on the key can be read by a reading device 9. The information carrier 5 of the key 1 is inserted into a cylindrical opening 11 in the housing 13 of the reading device with the opening 11 arranged to receive the information carrier 5. The reading device has a plurality of reading elements 15 susceptible to a magnetic field and arranged axially along as well as around the circumferential surface of the opening 11 in the pattern of the information elements 7. The reading elements respond either to the presence or absence of the information elements 7 in the pattern. The reading elements are connected to a comparator 17 which compares the locking code as read from the key 1 to a locking code supplied from a code generator 19. When the predetermined locking code coincides with the locking code read from the key 1, the comparator 17 emits a signal at its output 21 which can be utilized for operating the lock, not shown.

The lock may be a central locking system or a theft protection system for a motor vehicle. The magnetic information elements 7 can be separate permanent magnets inserted into a non-magnetic body on the key. However, the key may be formed of a magnetic material which is magnetized in the zones in which the information elements are located. The reading elements may be Hall probes or reed switches.

At the end of the information carrier 5 adjacent the grip portion 3, an axially extending projection 23 extends radially outwardly from the cylindrical periphery of the information carrier 5. The projection 23 engages, in a form locking manner, in a groove 25 formed in the surface of the opening 11 within the housing 13 of the reading device 9. The groove 25 is adapted to receive the projection 23. The combination of the projection 23 and the groove 25 align the information carrier 5 in the circumferential direction relative to the reading elements 15 in the reading device 9. A shoulder 27 located at the end of the projection 23 more remote from the grip portion 3, determines the depth of insertion of the information carrier into the housing 13. In the fully inserted position of the key, the shoulder 27 contacts a countershoulder 29 at the inner end of the groove 25. At the end of the information carrier 5, located just outside the housing 13 when the key 1 is fully inserted, an annular shaped shoulder 31 extends radially outwardly from the cylindrical periphery of the information carrier and the shoulder rests against the surface of the housing in the inserted position. The shoulder 27 and the annular shaped shoulder 31 can be dimensioned so that, in the inserted position of the key, they determine either jointly or individually the axial position of the key relative to the reading device 9. At the free end of the carrier 5, that is the end opposite the grip portion 3, a conically shaped stop head 3 is provided and a groove 35 extends around the circumference of the stop head. In the inserted position of the key 1, a spring-loaded snap-in member 37, located at the inner end of the opening 11, engages within the groove 35. The snap-in member 37 can be displaced radially relative to the opening 11 permitting the insertion of the head 33. The conical surface of the stop head 33 forms an obliquely extending guide surface which deflects the snap-in member 37 out of its path as the key 1 is inserted.

To prevent the comparator 17 from reading and comparing the code on the key before the key is fully inserted, the comparator 17 has a release input 39 connected to an additional reading element 41 which is susceptible to a magnetic field. The reading element 41 responds to an additional magnetic information element 43 positioned in the projection 23 on the information carrier 5. The information element 43 is spaced radially from the axis of the information carrier 5 by a greater amount than the remaining information elements 7 located along the circumferential periphery of the carrier. The radial distance of the information element 43 from the axis is selected so that the reading element is actuated only by the information element 43 and not by the information elements 7 which precede it as the key is inserted into the opening 11. The comparator is released only when the key is completely inserted into the housing 13. If necessary, a time delay can be incorporated into the release of the comparator 17 to prevent the comparator from being released while the key is still in motion.

Figure 2:
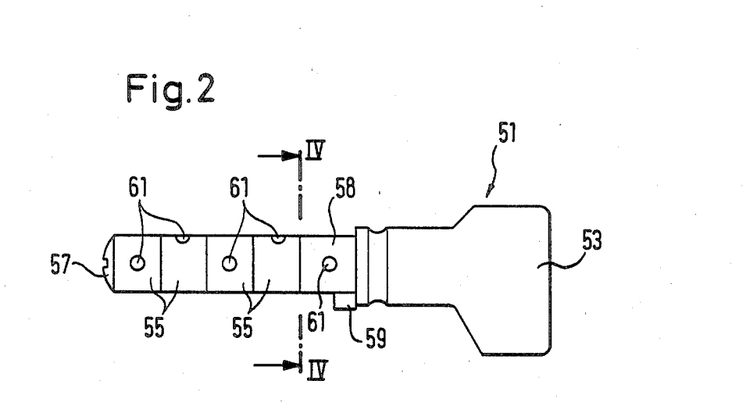
FIG. 2 is a side view of another embodiment of a key which can be used in the locking device shown in FIG. 1.
Figure 3:
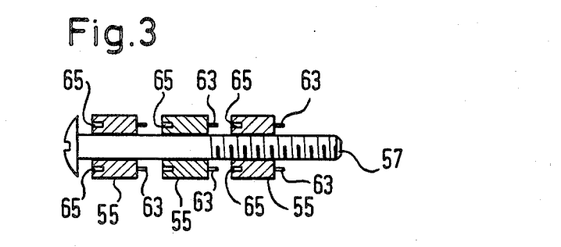
FIG. 3 is a detail view of a part of the key shown in FIG. 2.
Figure 4:
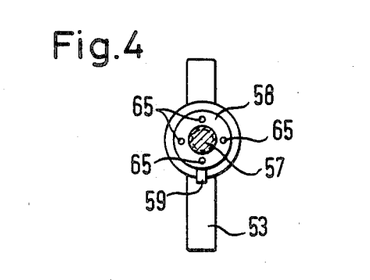
FIG. 4 is a sectional view through the key illustrated in FIG. 2 taken along the line IV—IV.

To permit the locking code of the key 1 to be changed over a wide range of different locking codes while keeping the production costs as low as possible, and, if necessary, to permit the locking code to be changed once it is set, a portion of the information elements is arranged on the information carrier parts and the parts are arranged next to one another along the axis of the key, however, each carrier part can be moved relative to the other around the axis in a variable angular pattern. The information carrier parts determine the pattern in the axial direction of the information carrier, however, by turning the individual information carrier parts around the axis relative to one another it is possible to vary the locking code. FIGS. 2-4 show a key 51 similar to the key illustrated in FIG. 1 having a grip portion 53 with the information carrier parts formed by rings or annular shaped members 55 fitted on to an axially extending screw 57 which is threaded into the grip portion. Another information carrier part 58 is formed as a unitary part of the grip portion 53 and includes a projection 59 similar in function and design to the projection 23 of the key 1 shown in FIG. 1. The information carrier parts 55 and 58 carry magnetic information elements 61 capable of being read by a reading device in the manner described above in connection with FIG. 1. In projection 59, an information element is included which releases the reading device.

As can be seen in FIG. 3, each of the adjustable information carrier parts 55 have pins 63 extending from one of their transversely extending faces while the opposite transversely extending face has plug openings 65 aligned with the pins located on the opposite end surface. The pins 63 on one information carrier element 55 engage within the plug openings 65 on the next carrier element. The pins 63 and openings 65 are arranged in the angular pattern of the reading elements in the reading device. In the embodiment displayed in FIGS. 2-4, the angular pattern positions are offset relative to one another by 90°, accordingly, as shown in FIG. 4, four openings 65 are equiangularly spaced around the end surface of the carrier element. It is possible, to provide the desired effect with a smaller number of pins 63.

To change the angular position of the information carrier elements 55 relative to one another, the screw is unthreaded out of the grip portion 53 at least to the extent that the pins 63 can be displaced out of the opening 65. With the information carrier parts in the desired positions, the screw is tightened.

Since one of the information carrier parts is rigidly connected to the grip portion 53, that is, the information carrier part 58, the locking code for the key 51 is made up of a fixed base code portion and a variable code portion. Such an arrangement is particularly advantageous in relatively extensive locking systems with a plurality of keys. The magnetic information elements are illustrated in the figures. In an actual embodiment of the device, the information elements can be covered by foil or similar means so that the locking code can not be read from the outside appearance of the key. This is particularly advantageous in reading devices capable of reading the locking code of the key for purposes of programming.

Figure 5:
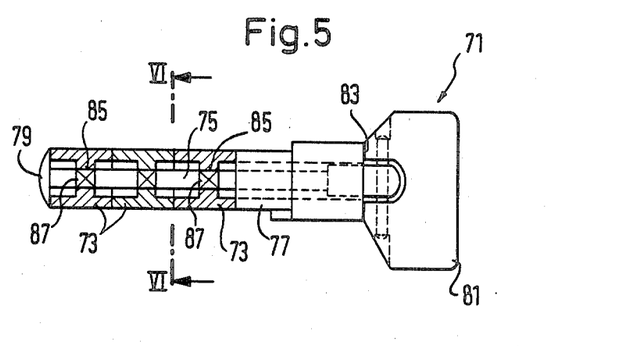
FIG. 5 is another embodiment of a key usable in the locking device displayed in FIG. 1.
Figure 6:
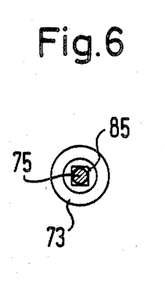
FIG. 6 is a cross-sectional view through the key shown in FIG. 5 taken along the line VI—VI.

In FIGS. 5 and 6 a key 71 is illustrated which differs from the key 51 in FIGS. 2-5 only by the manner in which the information carrier parts 73 are locked on the key. The carrier parts can be moved angularly relative to one another in the angular pattern of the reading elements in the reading device. The information carrier parts are annularly shaped members and are positioned next to one another along the axial part of the key. The carrier parts can be moved along the axial part 75. Further, the axial part 75 is slidably arranged in an opening extending through the base portion 77 of the key. At its end spaced from the grip portion of the key, the axial part 75 has an abutment head 79 which extends outwardly from the adjacent information carrier 73. The opposite end of the axial part 75 extends through the base portion 77 and terminates in a tiltable clamp handle 81 having a cam profile 83. The clamp handle 81 is a part of the grip portion of the key 71. The cam profile is arranged to clamp the abutment head 79 and the information carrier parts 73 against the base portion 77. When the clamp handle is turned in a direction transversely of the axial direction of the axial part 75, a certain amount of play is provided along the axial part so that the information carrier parts 73 are released and can be moved angularly about the axis relative to one another.

The information carrier parts 73 are shaped as rings or annularly shaped members each having an equilateral polygonally shaped axially extending interior surface 85, note FIG. 6. As shown in FIGS. 5 and 6, the interior surface 85 is a square in cross-section and has an axial length less than half of the axial length of one of the annularly shaped members. The axial part 75 of the key has axially extending polygonally shaped exterior surfaces 87 each of which also extend for less than half the axial length of one of the annularly shaped members. The remaining interior surfaces of the annularly shaped members are cylindrical and the diameter of these surfaces is larger than the diagonal of the polygonally shaped surfaces 87 of the axial part. In the clamped position, the shaped surfaces 87 of the axial part 75 engage the similarly shaped surface 85 of the information carrier parts 73 and the parts are locked against rotational movement in the axial part. When the clamp handle 81 is turned, the shaped surfaces 87 of the axial part 75 are displaced axially out of the similarly shaped surfaces 85 and the information carrier parts 73 can be freely rotated around the axis of the axial part. Since the axial part 75 is fixed on the clamp handle 81, the information carrier parts 73 are retained on the key 71.

Figure 7:
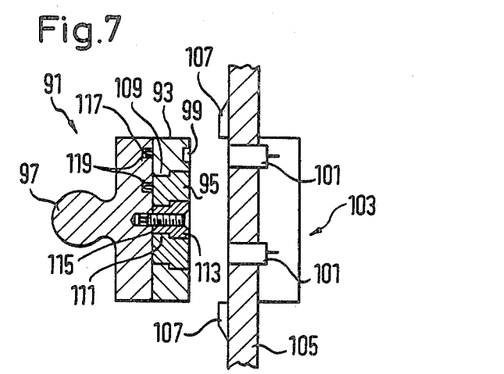
FIG. 7 is a cross-sectional view through a key and reading device in a second embodiment of the locking device of the present invention.
Figure 8:
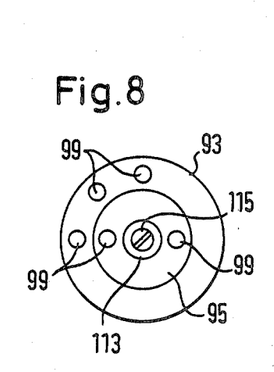
FIG. 8 is a front view of the key shown in FIG. 7.

In FIGS. 7 and 8, another embodiment is illustrated, including a key 91 which, unlike the above-described embodiments, has the annularly shaped information carrier parts 93, 95 arranged concentrically one around the other and secured to grip portion 97. Unlike the other embodiments where the carrier parts follow one after the other along the axial direction of the key, in this embodiment one of the carrier parts 93 concentrically encircles the other carrier part 95. Further, unlike the above described embodiments, the key is a relatively flat member, it is not axially elongated. Information elements 99 may be magnetic information elements and are located on the planar end face of the information carrier parts 93, 95 extending transversely of the axial direction of the parts. Further, the information elements are located on the surface of the carrier parts facing away from the grip portion 97. The information elements 99 are arranged in a predetermined angular pattern which coincides with the angular pattern of reading elements 101 in the reading device 103.

The function and manner of operation of the reading device 103 corresponds to that of the reading device in FIG. 1. The axial length of the reading device 103 can be maintained very small so that the device is kept especially flat so that it can be arranged on a planar surface. As long as the reading elements 101 have sufficient sensitivity, they must not extend through the front plate 105, accordingly, the reading device, if necessary, can be located on an existing surface, such as a glass pane. Projections 107 on the surface of the front plate 105 provide alignment for the key 91.

The information carrier parts 93, 95 each have an inwardly projecting annular shoulder 109, 111 which engages the adjacent surface of the radially inner carrier part or of the insert 113. The insert 113 extends through an opening along the axis of the inner carrier part 95 and the insert 113 is secured to the grip portion 97 by a screw 115. The combination of the screw 115 along with the insert 113, and the annular shoulders 109, 111 secures the information carrier parts 93, 95 to the grip portion 97. Pins 117 extend axially from the transverse surfaces of the carrier parts 93, 95 facing the grip portion 97 and engage in corresponding openings 119 in the grip portion. The pins 117 and openings 119 are arranged in the angular pattern of the information elements 99 so that the carrier parts can be turned relative to one another around the central axis passing through the screw 115 for varying the locking code of the key. The carrier parts can be moved angularly relative to one another, after the screw 115 is loosened, permitting the removal of the pins 117 out of the openings 119.

Each of the information carrier parts in the above described embodiments may include several information elements and each information carrier part may be assigned several reading elements in the reading device. The information elements of the individual information carrier parts and the reading elements are preferably offset in an angular pattern in such a manner that each angular position of the information carrier parts affords a different locking code position.

Figure 9:
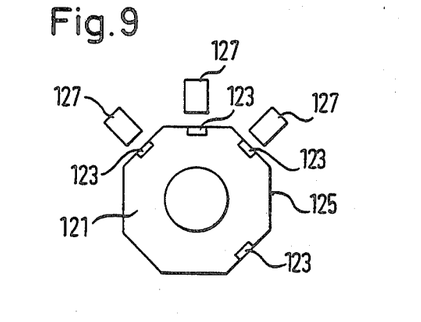
FIG. 9 is a schematic cross-section of a third embodiment of the locking device of the present invention.

In FIG. 9 a schematic arrangement is shown of an information carrier part 121 for a key in which the carrier parts can be rotated relative to one another through eight equal angular steps. Each information carrier part contains four information elements 123. Three of these information elements 123 are arranged next to one another, that is, in immediately adjacent angular pattern positions, however, the fourth information element 123 is spaced from the other three by one angular pattern position 125 which is left open or vacant. In the reading device, not shown in detail, three reading elements 127 are provided for each information carrier part 121. The reading elements 127 are arranged in immediately adjacent positions of the angular pattern. In each of the eight possible angular positions of the information carrier part 121, the three reading elements 127 generate a different bit pattern.

In FIG. 9, the information carrier part 121 has an octagonal shape around its outside surface. The opening in a reading device for receiving a key with such information carrier parts 121 has a corresponding shape. The principle of FIG. 9 can be used with round information carrier parts.

In the above-described embodiments, the keys are provided with magnetic information elements which are read by reading elements in the reading device which are susceptible to a magnetic field. As already mentioned, the magnetic information elements can be formed as permanent magnets, separately inserted into the key body. The key body, however, can at least partially be formed of a magnetic material which is magnetized in those regions intended to contain the information elements. These principles allow a very versatile coding of the key and also permit the coding to be changed. These principles can be applied to other embodiments of the information elements and the corresponding reading elements.

Figure 10:
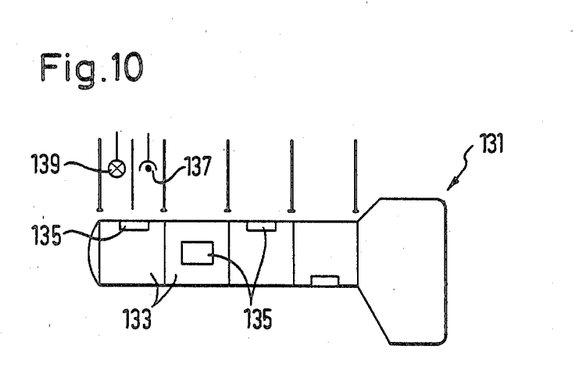
FIGS. 10–12 are schematic illustrations of additional embodiments of locking devices incorporating the present invention.

In FIG. 10, a key is illustrated having information carrier parts 133 which are angularly displaceable relative to one another. Each of the carrier parts has a surface region 135 having an optical reflecting character which is different from the reflecting character of the remaining surface of the carrier parts. The reading device, shown only partly in a schematic arrangement, includes photo elements 137 which receive the light emitted from a light source 139 and reflected off the surface of the juxtaposed information carrier part 133. The identity of the reflected light depends on whether it is reflected from one of the surface regions 135 or by the remaining surface of the information carrier part. The surface regions 135 provide the information elements establishing the locking code. In FIG. 10, a single photo element 137 is assigned to the light source 139. The light source 139, however, may also provide light for some or all of the photo elements of the reading device.

Figure 11:
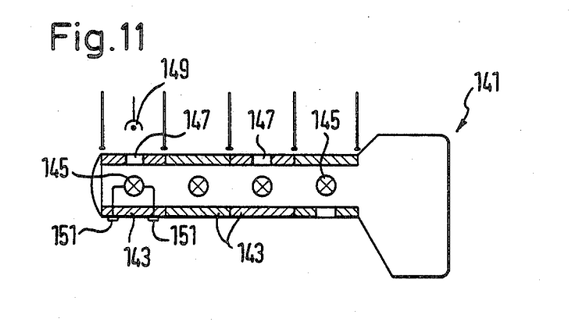

FIG. 11 illustrates another optical-electric coding of keys. In the embodiment in FIG. 10 the light source is located exteriorly of the key and the photo elements receive the reflected light from the light source, however, in FIG. 11 a key 41 has hollow angularly adjustable information carrier parts 143 in which light sources 145 are located in the interior of the carrier parts. In the formation of the information elements, windows 147 are provided in the information carrier parts 143 so that the light from light source 145 passes through the windows. The reading device contains light receivers, for example, photo elements 149 which receive light based on the arrangement of the locking code of the key 141. Light source 145 is connected to contact surfaces 151 through which the light source is provided with current from the source supplying the reading device. Alternatively, a battery or the like could be arranged in the key. In the embodiment displayed in FIG. 11, each of the information carrier parts 143 is assigned a separate light source. The light source can also be utilized, however, for the illumination of the windows of some or all of the information carrier parts. The light source may be a photo diode which is arranged in the wall of the information carrier part. In such an arrangement, the information carrier part does not have to be hollow.

Figure 12:
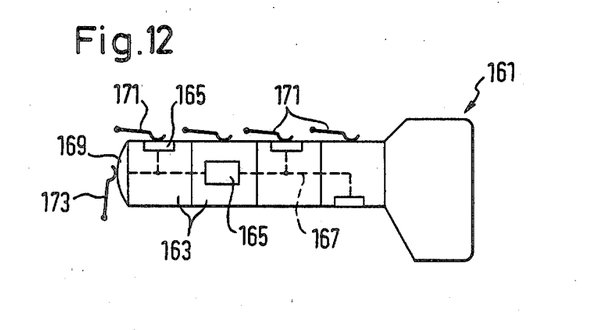

In FIG. 12, a key is illustrated having angularly adjustable information carrier parts formed of an electrically insulating material. Electrically conductive contact surfaces 165 are formed on the outer surface of the information carrier parts and act as information elements. As indicated by the dash line 167, the contact surfaces 164 are connected to a contact surface 169. In turn, contact surface 169 touches contact 173 of the reading device to which a predetermined voltage potential is supplied. Based on whether the contacts 171 touch the contact surfaces 165, they carry the potential of contact 173 or a potential which differs from that of contact 173. Other connection arrangements for the contact surfaces 165 are possible. It is also possible that two contacts of the reading device are connected to each contact surface 165. Preferably, the potential applied to the contact 173 is a potential to the chassis so that keys, as shown in FIG. 12, can be used in motor vehicles.

While specific embodiments of the invention have been shown and described in detail to illustrate the application of the inventive principles, it will be understood that the invention may be embodied otherwise without departing from such principles.

What is claimed is:

1. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, said means for securing said information carrier parts comprises an axially elongated member, said information carrier parts comprise annularly spaced parts encircling said axially elongated member and arranged one after the other in the axial direction of said axially elongated member, and at least one said information element on the periphery of each said information carrier part, each of said annularly shaped parts has a polygonally shaped interior surface symmetrical to the axial direction of said axially elongated member and said axially elongated part has a polygonally shaped surface on the exterior thereof complementary to said polygonally shaped interior surface, and the polygonally shaped interior surface of said annularly shaped parts extends for less than half of the axial length of said annularly shaped part and the complementary polygonally shaped exterior surface on said axially elongated member for each of said annularly shaped parts extends for the axial length of the polygonally shaped interior surface on said annularly shaped part.

2. Locking device, as set forth in claim 1, wherein at least a number of said information carrier parts carry a plurality of said information elements with said elements each spaced an equal radial distance outwardly from the common axis and said information elements being angularly offsettable relative to one another in the predetermined angular pattern, and said reading device comprises a plurality of reading elements for said information elements on said information carrier parts, and said reading elements being offset relative to one another in the predetermined angular pattern.

3. Locking device, as set forth in claim 1, wherein the number of said information elements on each said information carrier part varies from the number of said reading elements in said reading device aligned opposite each said information carrier part.

4. Locking device, as set forth in claim 3, wherein said information carrier parts are angularly displaceable about the common axis in eight angularly spaced positions uniformly distributed over 360°, each said information carrier part contains four said information elements, three of said four information elements are located in adjacent angular pattern positions and the fourth one of said four information elements is spaced from the other three so that one vacant angular pattern position is located therebetween and said reading device has three reading elements arranged in adjacent angular pattern positions for each said information carrier part.

5. Locking device, as set forth in claim 1, wherein said grip portion includes a base portion extending therefrom in the axial direction of said axially elongated member, said axially elongated member extends through said annularly shaped parts and said base part, an abutment head formed on the end of said axially elongated member spaced from said grip portion and a clamp handle located on the opposite end of said axially elongated member, said clamp handle being displaceable between a first position and a second position and in the first position said annularly shaped parts are clamped between said clamp handle and said abutment head and in the second position said annularly shaped parts are displaceable in the axial direction of said axially elongated member.

6. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, said means for securing said information carrier parts comprises an axially elongated member, said information carrier parts comprise annularly shaped parts encircling said axially elongated member and arranged one after the other in the axial direction of said axially elongated member, and at least one said information element on the periphery of each said information carrier part, and each said annularly shaped part has a first end surface and a second end surface each extending transversely of the axis of said axially elongated member and one of said first and second end surfaces having at least one plug projection extending outwardly therefrom in the axial direction of said axially elongated member and the other one of said first and second end surfaces having plug recesses spaced angularly apart around the axis of said axially elongated member and arranged to receive one of said plug projections on another said annularly shaped part.

7. Locking device, as set forth in claim 6, wherein said axially elongated member is a screw which can be screwed into said grip portion.

8. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, said information carrier parts comprise at least two co-axially arranged shaped parts one concentrically arranged around the other, and at least one information element located on the end surface of each said annular shaped part extending transversely of the central axis of said annularly shaped parts and spaced from said grip portion.

9. Locking device, as set forth in claim 8, wherein each of said annular shaped parts has a surface extending in the direction of the central axis and facing inwardly toward the central axis, a shoulder formed in the inwardly facing surface with said shoulder being spaced from the surface containing said information element, said shoulder arranged to engage one of the inwardly located said annular shaped part or said means for securing said information carrier parts to said grip element.

10. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, and in addition to said angularly positionable information carrier parts, a second information carrier part is rigidly connected to said grip portion and is located between said grip portion and said angularly positionable information carrier parts, and one said information element located in said second information carrier part.

11. Locking device, as set forth in claim 10, wherein said information element located in said second information carrier part is arranged in the angular pattern of said information elements on said angularly positionable information carrier parts.

12. Locking device, as set forth in claim 11, wherein said information element on said second information carrier part is located between said angularly positionable information carrier parts and said grip portion.

13. Locking device, as set forth in claim 12, wherein said information element on said second information carrier part is arranged to release said reading device for reading and/or comparing said information elements on said angularly positionable information carrier parts when said key is inserted into said reading device.

14. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern and at least one of said information carrier parts and said grip portion is formed of a permanent magnet material which is magnetized in selected regions.

15. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, and permanent magnets are individually inserted into at least one of said information carrier parts and said grip portion.

16. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, at least one of said information carrier parts and said grip portion is formed of an electrically insulating material, and said information elements comprise electrical contact surfaces located in individual areas on the outer surface of said electrically insulating material, and said reading elements comprises contacts arranged for engagement with said electrical contact surfaces.

17. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, said information elements comprise outer surface regions on said information carrier parts having a different optical reflecting characteristic than the remainder of the outer surface of said information carrier parts, said reading device comprises at least one light source for illuminating the outer surface of said information carrier parts, and said reading elements comprise photo elements.

18. Locking device comprising a key and a reading device, said key comprising a grip portion, a plurality of information carrier parts mounted on said grip portion, information elements located in said information carrier parts for determining the locking code of said key, said information carrier parts being adjustably positionable relative to one another for arranging said information elements in a predetermined angular pattern, said reading device arranged to read the locking code on said key and to compare the locking code as read with a predetermined locking code, wherein the improvement comprises means for securing said information carrier parts to said grip portion and providing a common axis extending from said grip portion about which axis said information carrier parts are angularly adjustably positionable, and said reading device includes means for detecting one of the presence or absence of said information elements in at least a portion of the predetermined positions of the angular pattern, said information elements on one of said information carrier parts and said grip portion comprise active light emitters, and said reading elements on said reading device comprise photo elements.

19. Locking device, as set forth in claim 18, wherein said key includes a hollow space located radially inwardly from and extending axially through said information carrier parts, a light source located within said hollow space, and said information carrier parts having a light permeable window at each location of said information elements so that the light from said light source in said hollow space is emitted through said windows.

20. Locking device, as set forth in claim 18, wherein a light diode is located in said information carrier parts at the location of said information elements therein.

* * * * *